United States Patent
Kim et al.

(10) Patent No.: US 9,205,384 B2
(45) Date of Patent: Dec. 8, 2015

(54) HIGH PERMEATE FLUX REVERSE OSMOSIS MEMBRANE INCLUDING CARBODIIMIDE COMPOUND AND METHOD OF MANUFACTURING THE SAME

(71) Applicant: LG CHEM, LTD., Seoul (KR)

(72) Inventors: Jae-Hong Kim, Daejeon (KR); Young-Ju Lee, Daejeon (KR); Chong-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/004,990

(22) PCT Filed: May 31, 2013

(86) PCT No.: PCT/KR2013/004820
§ 371 (c)(1),
(2) Date: Sep. 13, 2013

(87) PCT Pub. No.: WO2013/180517
PCT Pub. Date: Dec. 5, 2013

(65) Prior Publication Data
US 2015/0083660 A1 Mar. 26, 2015

(30) Foreign Application Priority Data

May 31, 2012 (KR) .......................... 10-2012-0058321
May 31, 2013 (KR) .......................... 10-2013-0062506

(51) Int. Cl.
*B01D 39/00* (2006.01)
*B01D 39/14* (2006.01)
(Continued)

(52) U.S. Cl.
CPC ................ *B01D 71/56* (2013.01); *B01D 69/02* (2013.01); *B01D 69/125* (2013.01); *B01D 61/025* (2013.01); *B01D 2323/02* (2013.01); *B01D 2325/20* (2013.01); *B01D 2325/30* (2013.01); *B01D 2325/38* (2013.01)

(58) Field of Classification Search
CPC .. B01D 2325/38; B01D 61/025; B01D 69/02; B01D 69/125; B01D 71/56
USPC ................................ 210/500.38, 500.39, 490
See application file for complete search history.

(56) References Cited

U.S. PATENT DOCUMENTS 4,277,344 A * 7/1981 Cadotte ......................... 210/654
4,601,829 A * 7/1986 Kaneko et al. ................. 210/638
(Continued)

FOREIGN PATENT DOCUMENTS

CN 101439270 A 5/2009
JP 2009-536874 A 10/2009
(Continued)

*Primary Examiner* — Ana Fortuna

(57) ABSTRACT

The present invention relates to a reverse osmosis membrane including a porous support including a polysulfone layer; and a polyamide active layer formed on the porous support, wherein a concentration of sulfur (S) detected on a surface of the polyamide active layer is $1.8 \times 10^{-3}$ units or less on average or a concentration of sulfur dioxide ($SO_2$) detected on the surface of the polyamide active layer is $7 \times 10^{-3}$ units or less on average, and a method of manufacturing a reverse osmosis membrane, the method including forming a porous support; and forming a polyamide active layer on the porous support by interfacially polymerizing a polyfunctional amine solution including a carbodiimide compound, and a polyfunctional acid halide compound solution.

10 Claims, 1 Drawing Sheet

(51) Int. Cl.
- *B01D 29/00* (2006.01)
- *B01D 71/56* (2006.01)
- *B01D 69/02* (2006.01)
- *B01D 69/12* (2006.01)
- *B01D 61/02* (2006.01)

(56) References Cited

U.S. PATENT DOCUMENTS

| | | | | |
|---|---|---|---|---|
| 4,693,895 | A | * | 9/1987 | Wong et al. ............. 424/473 |
| 4,704,324 | A | * | 11/1987 | Davis et al. ............ 428/308.4 |
| 5,051,178 | A | | 9/1991 | Uemura et al. |
| 5,593,588 | A | * | 1/1997 | Kim et al. ............... 210/490 |
| 8,505,743 | B2 | * | 8/2013 | Sarkar et al. ............. 210/490 |
| 2001/0042715 | A1 | | 11/2001 | Parekh et al. |
| 2009/0159527 | A1 | | 6/2009 | Mickols et al. |
| 2010/0216899 | A1 | | 8/2010 | Allen et al. |
| 2011/0155660 | A1 | | 6/2011 | Mickols et al. |
| 2013/0256215 | A1 | * | 10/2013 | Nakatsuji et al. ...... 210/500.33 |
| 2014/0251897 | A1 | * | 9/2014 | Livingston et al. .... 210/500.33 |

FOREIGN PATENT DOCUMENTS

| | | |
|---|---|---|
| KR | 10-1999-0019008 A | 3/1999 |
| KR | 10-1999-0070134 A | 9/1999 |
| KR | 10-0460011 B1 | 4/2005 |
| KR | 10-2010-0078822 A | 7/2010 |

* cited by examiner

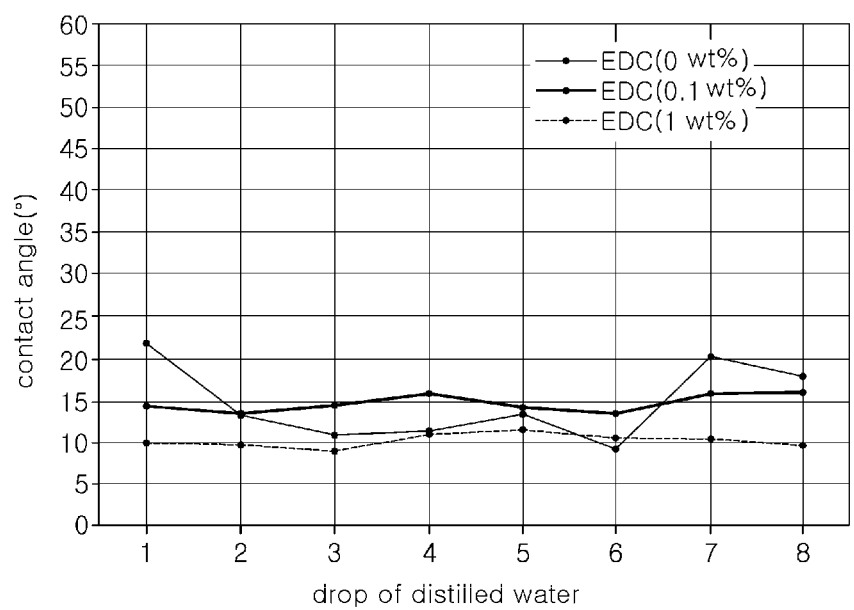

HIGH PERMEATE FLUX REVERSE OSMOSIS MEMBRANE INCLUDING CARBODIIMIDE COMPOUND AND METHOD OF MANUFACTURING THE SAME

TECHNICAL FIELD

The present invention relates to a method of manufacturing a high permeate flux reverse osmosis membrane including a carbodiimide compound, and a high permeate flux reverse osmosis membrane formed using the same.

BACKGROUND ART

In a process of separating materials using reverse osmosis, materials dissociated in a solution are separated from a solvent by a selective film such as a precision filtration membrane, an ultrafiltration membrane, or a reverse osmosis membrane. A reverse osmosis membrane, a type of semipermeable membrane, may remove salts from brackish water, sea water and the like, using a principle of causing a solution and a solute to be separated in predetermined directions when an aqueous solution having salts dissolved therein is pressurized in one direction, thereby being used to desalinate a great quantity of water for industrial, agricultural, domestic and other purposes, into relatively lower-salinity water.

More specifically, brackish and sea water desalination processes using the reverse osmosis membrane refer to processes of filtering salts, ions or the like, dissolved in an aqueous solution through a reverse osmosis membrane and allowing refined water to pass through the membrane, when the reverse osmosis membrane passes through the aqueous solution having salts, ions or the like dissolved therein while pressure is applied to the aqueous solution. At this time, the level of applied pressure needs to be greater than that of osmotic pressure. Accordingly, osmotic pressure is higher in accordance with an increase in salinity and consequently, the pressure required to be applied to supply water may be increased, causing the depletion of a greater amount of energy.

Thus, in order to desalinate brackish water, sea water and the like, containing a great deal of salts, a reverse osmosis membrane needs to have properties allowing a great quantity of water to pass therethrough, even at relatively low pressure, that is, high permeate flux properties, as well as having good salt removal capabilities.

As described above, in order to increase a salt rejection rate and permeate flux performance of the reverse osmosis membrane, various patent documents according to the related art provide reverse osmosis membranes having an improved salt rejection rate and permeate flux and methods of manufacturing the same. For example, Korean Patent Laid-Open Publication No. 1999-0070132 (Sep. 15, 1999) is characterized by performing interfacial polymerization and then, carrying out an additional treatment process, Korean Patent Laid-Open Publication No. 1999-0070134 (Sep. 15, 1999) is characterized by using a mixed organic solvent, and Korean Patent Laid-Open Publication No. 1999-0019008 (Mar. 15, 1999) is characterized by adding an additive to an organic solvent.

However, in the case in which an additional process is undertaken before or after a porous support is immersed in a polyfunctional amine solution, a complex process is caused and costs required therefor are increased. In addition, in the case in which a mixed organic solvent is used or an additive is added to an organic solvent, the reverse osmosis membrane has limitations in terms of the salt rejection rate and the permeate flux thereof. In particular, according to the related art, it may be difficult to obtain significant effects in terms of hydrophilic properties and uniformity in hydrophilicity on a surface of a polyamide active layer in the reverse osmosis membrane.

Thus, the present invention is provided by the applicant thereof as a result of repeated research in order to develop a reverse osmosis membrane having improved degrees of compactness and uniformity in a polyamide active layer surface, as well as having an improved permeate flux and salt rejection rate, through a further effective, simple method.

DISCLOSURE

Technical Problem

An aspect of the present invention provides a reverse osmosis membrane having an improved salt rejection rate and permeate flux by enhancing hydrophilic properties and uniformity in hydrophilicity on a surface of a polyamide active layer thereof, and a method of manufacturing the same.

Technical Solution

According to an aspect of the present invention, there is provided a porous support including a polysulfone layer; and a polyamide active layer formed on the porous support, wherein a concentration of sulfur (S) detected on a surface of the polyamide active layer is $1.8 \times 10^{-3}$ units or less on average or a concentration of sulfur dioxide ($SO_2$) detected on the surface of the polyamide active layer is $7 \times 10^{-3}$ units or less on average.

The polyamide active layer may have variations in water contact angles within a range of 0.1 to 20%.

The polyamide active layer may have an average water contact angle of 0° to 15°.

The polyamide active layer may be formed by interfacially polymerizing a polyfunctional amine solution including a carbodiimide compound and a polyfunctional acid halide compound solution.

The carbodiimide compound may be represented by Formula 1:

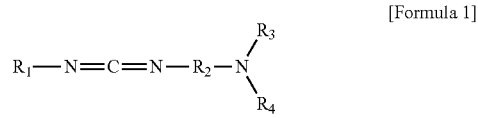

[Formula 1]

where, $R_1$, $R_3$ and $R_4$ each independently indicate a hydrogen atom, a substituted or unsubstituted alkyl group having 1 to 30 carbon atoms, or a substituted or unsubstituted aryl group having 4 to 6 carbon atoms, and $R_2$ indicates a substituted or unsubstituted alkylene group having 1 to 30 carbon atoms, or a substituted or unsubstituted arylene group having 4 to 6 carbon atoms.

The carbodiimide compound may include at least one compound selected from a group consisting of N-(3-dimethylaminopropyl)-N'-ethylcarbodiimide, N,N'-dicyclohexylcarbodiimide, N,N'-diisopropylcarbodiimide, and N,N'-bis(2-methylphenyl)carbodiimide.

The carbodiimide compound may be included in an amount of 0.001 to 50 wt %, with respect to 100 w % of the polyfunctional amine solution.

According to another aspect of the present invention, there is provided a method of manufacturing a reverse osmosis membrane, the method including: forming a porous support; and forming a polyamide active layer on the porous support by interfacially polymerizing a polyfunctional amine solution including a carbodiimide compound, and a polyfunctional acid halide compound solution.

The carbodiimide compound may be represented by Formula 1:

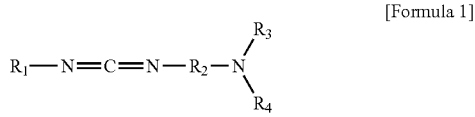

[Formula 1]

where, $R_1$, $R_3$ and $R_4$ each independently indicate a hydrogen atom, a substituted or unsubstituted alkyl group having 1 to 30 carbon atoms, or a substituted or unsubstituted aryl group having 4 to 6 carbon atoms, and $R_2$ indicates a substituted or unsubstituted alkylene group having 1 to 30 carbon atoms, or a substituted or unsubstituted arylene group having 4 to 6 carbon atoms.

The carbodiimide compound may include at least one compound selected from a group consisting of N-(3-dimethylaminopropyl)-N'-ethylcarbodiimide, N,N'-dicyclohexylcarbodiimide, N,N'-diisopropylcarbodiimide, and N,N'-bis(2-methylphenyl)carbodiimide.

The carbodiimide compound may be included in an amount of 0.001 to 50 wt %, with respect to 100 w % of the polyfunctional amine solution.

Advantageous Effects

According to a method of manufacturing a reverse osmosis membrane according to the present invention, a polyfunctional amine solution including a carbodiimide compound is used in the forming of a polyamide active layer, such that a reverse osmosis membrane having an improved salt rejection rate and permeate flux can be manufactured. In addition, in the reverse osmosis membrane manufactured by the method, since hydrophilic properties and uniformity in hydrophilicity are enhanced on a surface of a polyamide active layer, a salt rejection rate and a permeate flux of the polyamide active layer can be increased, thereby leading to improvements in chlorine resistance and contamination resistance properties.

DESCRIPTION OF DRAWINGS

FIG. 1 is a view illustrating water contact angles of respective drops of distilled water, measured after the drops of distilled water were dropped at intervals of 1 cm on a surface of a polyamide active layer of a reverse osmosis membrane according to the present invention, manufactured by adding N-(3-dimethylaminopropyl)-N'-ethylcarbodiimide (EDC) to a polyfunctional amine solution, in the forming of the polyamide active layer.

BEST MODE

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

A high permeate flux reverse osmosis membrane according to the present invention includes: a porous support including a polysulfone layer; and a polyamide active layer formed on the porous support, and in this case, a concentration of sulfur (S) detected on a surface of the polyamide active layer is $1.8 \times 10^{-3}$ units or less on average, or a concentration of sulfur dioxide ($SO_2$) detected on the surface of the polyamide active layer is $7 \times 10^{-3}$ units or less on average.

The porous support may be formed by casting a polymer resin on a non-woven fabric, and a material for the non-woven fabric may be, for example, polyester, polycarbonate, fine porous polypropylene, polyphenylene ether, polyvinylidene fluoride or the like, but is not limited thereto.

The porous support may have a thickness of 100 to 200 μm, 120 to 170 μm, or 140 to 150 μm. The reason for this is that when the thickness of the porous support is below 100 μm, the porous support may not tolerate pressure applied thereto at the time of operating a water-treated reverse osmosis membrane to cause damage to the reverse osmosis membrane, while when the thickness of the porous support is greater than 200 μm, surface roughness may be increased and a pathway through which water is discharged during the discharging of water may be extended, thereby leading to a lowering in the performance of the membrane.

In addition, an opening of the porous support may have a diameter of 10 to 70 nm. The reason for this is that a suspended material, a polysaccharide, a protein, a polymer material, or the like, generally known as a material capable of being separated from the porous support, could be effectively separated when the opening thereof has a diameter within the numerical range.

The polymer material may be at least one selected from a group consisting of, for example, polysulfone, polyether sulfone, polyethylene oxide, polyimide, polyamide, polyetherimide, polyether ether ketone, polyacrylonitrile, polymethylmethacrylate, polyethylene, polypropylene, polymethylpentene, poly methyl chloride and polyvinylidene fluoride. In the present invention, the polymer material may be polysulfone.

The polyamide active layer may be formed on the porous support, thereby serving to eliminate salts. In addition, the polyamide active layer according to the present invention may be formed by interfacially polymerizing a polyfunctional amine solution including a carbodiimide compound and a polyfunctional acid halide compound solution.

The polyfunctional amine solution is not limited, but may be, for example, m-phenylenediamine, p-phenylenediamine, 3,6-benzene triamine, 4-chloro-1,3-phenylene diamine, 6-chloro-1,3-phenylene diamine, or 3-chloro-1,4-phenylenediamine, or a mixture thereof.

The carbodiimide compound is a compound including a structure of alkyl combined with a primary amine, a secondary amine and/or a tertiary amine. More specifically, the carbodiimide compound included in the polyfunctional amine solution may be represented by Formula 1:

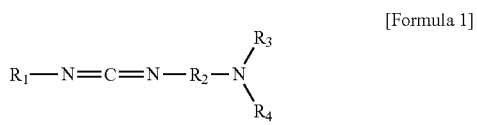

[Formula 1]

where, $R_1$, $R_3$ and $R_4$ each independently indicate a hydrogen atom, a substituted or unsubstituted alkyl group having 1 to 30 carbon atoms, or a substituted or unsubstituted aryl group having 4 to 6 carbon atoms, and $R_2$ indicates a substituted or unsubstituted alkylene group having 1 to 30 carbon atoms, or a substituted or unsubstituted arylene group having 4 to 6 carbon atoms.

For example, the carbodiimide compound is not limited, but may include at least one compound selected from a group consisting of N-(3-dimethylaminopropyl)-N'-ethylcarbodiimide (EDC), N,N'-dicyclohexylcarbodiimide (DCC), N,N'-diisopropylcarbodiimide (DIC) and N,N'-bis(2-methylphenyl)carbodiimide (BPC).

In the specification, the N-(3-dimethylaminopropyl)-N'-ethylcarbodiimide (EDC) has the same meaning as that generally described as 1-[3-(dimethylamino)propyl]-3-ethylcarbodiimide or 1-ethyl-3-(3-dimethylaminopropyl) carbodiimide.

Further, in the forming of the polyamide active layer, the carbodiimide compound may be included in an amount of 0.001 to 50 wt %, with respect to the overall weight of the polyfunctional amine solution. In addition, the carbodiimide compound may be included in an amount of 0.01 to 5 wt % or 0.01 to 0.5 wt %, with respect to the overall weight of the polyfunctional amine solution. When the content of the carbodiimide compound satisfies the numerical range, the salt rejection rate and the permeate flux may be improved, and hydrophilic properties and uniformity in hydrophilicity on the surface of the polyamide active layer may be advantageously enhanced.

However, when the carbodiimide compound is included in an amount greater than 0.01 wt % with respect to the overall weight of the polyfunctional amine solution, since improvements in permeate flux in accordance with an increase in the amount of the carbodiimide compound, may be restricted, it may be difficult to suppress an increase in manufacturing costs. Thus, in consideration of effects obtainable in comparison with manufacturing costs, the carbodiimide compound may be included in an amount between 0.001 and 0.01 wt % with respect to 100 wt % of the polyfunctional amine solution.

Furthermore, the polyamide active layer of the reverse osmosis membrane according to the present invention may include the carbodiimide compound.

The polyfunctional acid halide compound solution may be fabricated by dissolving at least one reactant selected from a group consisting of a polyfunctional acyl halide, a polyfunctional sulfonyl halide, and a polyfunctional isocyanate in an organic solvent. The polyfunctional acyl halide usable in the present invention may be at least one selected from a group consisting of trimesoyl chloride (TMC), isophthaloyl chloride (IPC) and terephthaloyl chloride (TPC).

The organic solvent may be a halogenated hydrocarbon such as Freon, or an aliphatic hydrocarbon solvent such as hexane, cyclohexane, heptane, an n-alkane having 8 to 12 carbon atoms or the like. In this case, the aliphatic hydrocarbon solvent may enable 0.05 wt % or greater of the polyfunctional acyl halide to be dissolved. For example, an n-alkane having 5 to 12 carbon atoms, a mixture of structural isomers of a saturated or unsaturated hydrocarbon having 8 carbon atoms, or a cyclic hydrocarbon having 5 to 7 carbon atoms, or a mixture of two or more of the solvents may be used.

The concentration of sulfur (S) detected on the surface of the polyamide active layer through Time-of-Flight Secondary-Ion Mass Spectroscopy (TOF-SIMS) analysis may be $1.8 \times 10^{-3}$ units or less on average, may be $1 \times 10^{-4}$ to $1.8 \times 10^{-3}$ units on average, or may be $1.3 \times 10^{-3}$ to $1.8 \times 10^{-3}$ units on average.

The concentration of sulfur dioxide ($SO_2$) detected on the surface of the polyamide active layer through TOF-SIMS analysis may be $7 \times 10^{-3}$ units or less on average, may be $1 \times 10^{-4}$ to $7 \times 10^{-3}$ units on average, or may be $5 \times 10^{-3}$ to $7 \times 10^{-3}$ units on average.

The concentration of sulfur (S) and the concentration of sulfur dioxide ($SO_2$) detected on a surface of a polyamide active layer according to the related art reverse osmosis membrane, using TOF-SIMS analysis are generally $1.9 \times 10^{-3}$ to $2.1 \times 10^{-3}$ units on average and $7.4 \times 10^{-3}$ to $8.2 \times 10^{-3}$ units on average, respectively.

As in the present invention, the fact that the concentration of sulfur (S) or sulfur dioxide ($SO_2$) detected on the surface of the polyamide active layer has a low value, as described in the range, denotes that the polyamide active layer is densely formed on the porous support to significantly reduce an amount of sulfur (S) or sulfur dioxide ($SO_2$) exposed externally from the polysulfone layer of the porous support.

Meanwhile, the surface of the polyamide active layer may have an average water contact angle of 0° to 15°, 0° to 10°, or 5° to 13°. In the present invention, the "average water contact angle" is obtained by measuring a contact angle of the polyamide active layer with respect to distilled water using the sessile drop method. Specifically, the "average water contact angle" is obtained by dropping distilled water on the surface of the polyamide active layer and measuring angles between a surface of the polyamide active layer and a surface of a water drop several times to obtain an average contact angle.

As described above, the fact that the surface of the polyamide active layer has a lower average water contact angle denotes that the polyamide layer is densely and uniformly formed, such that the surface of the polyamide active layer has excellent hydrophilic properties.

Meanwhile, FIG. 1 is a view illustrating water contact angles of respective eight drops of distilled water, measured after eight drops of distilled water were dropped at intervals of 1 cm on the surface of the polyamide active layer of the reverse osmosis membrane according to the present invention. According to FIG. 1, it may be confirmed that the polyamide active layer formed by adding the carbodiimide compound to the polyfunctional amine solution has low variations in water contact angles, as compared to a polyamide active layer formed without the carbodiimide compound. The result shows that the surface of the polyamide active layer of the reverse osmosis membrane according to the present invention is uniformly formed. Meanwhile, in the present invention, the variation in water contact angle refers to a value obtained by dividing a difference between the maximum value and the minimum value of respective water contact angles measured after dropping several drops of distilled water at uniform intervals on the surface of the polyamide active layer, by the average water contact angle.

The variations in water contact angles are not limited, but may be 0.1 to 20%, 0.1 to 10%, 0.1 to 8.5%, or 0.1 to 1%.

As described above, the fact that the surface of the polyamide active layer has low variations in water contact angles denotes that when the polyamide active layer is formed on the porous support, the surface thereof may be uniformly formed to have improved hydrophilic properties.

As described above, the surface of the polyamide active layer of the reverse osmosis membrane is further densely formed, such that the salt rejection rate of the reverse osmosis membrane according to the present invention may be increased and the hydrophilic properties and uniformity in hydrophilicity may be improved, thereby leading to an increase in permeate flux of the reverse osmosis membrane according to the present invention.

Next, a method of manufacturing the reverse osmosis membrane according to the present invention described above will be described. The reverse osmosis membrane according to the present invention may be manufactured by adding the carbodiimide compound to the polyfunctional amine solution.

More specifically, the method of manufacturing the reverse osmosis membrane according to the present invention may include forming the porous support, and forming the polyamide active layer on the porous support by interfacially polymerizing the polyfunctional amine solution including the carbodiimide compound and the polyfunctional acid halide compound solution.

When the polyfunctional amine solution and the polyfunctional acid halide compound solution are interfacially polymerized, the carbodiimide compound may not actually involved in a reaction therebetween, but may be serve as a medium, thereby enabling the surface of the polyamide active layer to be further densely formed.

The forming of the porous support may refer to a process of casting a polymer material on a non-woven fabric. A material of the non-woven fabric, a material of the polymer material, and a thickness of the porous support, and an opening of the porous support are the same as those described above and thus, descriptions thereof will be omitted.

In the present invention, the related art technology may be used without limitation, in the method of manufacturing the porous support. For example, a stretching method of forming a melted polymer to have a sheet shape, allowing the sheet-shaped polymer to have a laminated lamellar structure through a thermal treatment, and then performing uniaxial stretching to delaminate an interface between crystals, or a phase separation method of heating and melting a polymer and a solvent to form a sheet-shaped material, performing microphase separation, and then performing uniaxial or biaxial stretching while extracting the solvent, may be used.

Meanwhile, the forming of the polyamide active layer on the porous support by interfacially polymerizing the polyfunctional amine solution including the carbodiimide compound and the polyfunctional acid halide compound solution may refer to, for example, a process of immersing the porous support in the polyfunctional amine solution including the carbodiimide compound, bring the polyfunctional amine solution into contact with the polyfunctional acid halide compound solution to perform interfacial polymerization, removing an excessive amount of aqueous solution on the porous support, and drying the porous support to thereby form an active layer on the porous support.

The carbodiimide compound is a compound including a structure of alkyl combined with a primary amine, a secondary amine and/or a tertiary amine. More specifically, the carbodiimide compound included in the polyfunctional amine solution may be represented by Formula 1.

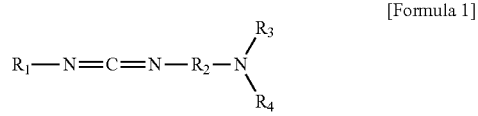

[Formula 1]

where, $R_1$, $R_3$ and $R_4$ each independently indicate a hydrogen atom, a substituted or unsubstituted alkyl group having 1 to 30 carbon atoms, or a substituted or unsubstituted aryl group having 4 to 6 carbon atoms, and $R_2$ indicates a substituted or unsubstituted alkylene group having 1 to 30 carbon atoms, or a substituted or unsubstituted arylene group having 4 to 6 carbon atoms.

For example, the carbodiimide compound is not limited, but may include at least one compound selected from a group consisting of N-(3-dimethylaminopropyl)-N'-ethylcarbodiimide (EDC), N,N'-dicyclohexylcarbodiimide (DCC), N,N'-diisopropylcarbodiimide (DIC) and N,N'-bis(2-methylphenyl)carbodiimide (BPC).

In the forming of the polyamide active layer, the carbodiimide compound may be included in an amount of 0.001 to 50 wt %, with respect to the overall weight of the polyfunctional amine solution. In addition, the carbodiimide compound may be included in an amount of 0.01 to 5 wt % or 0.01 to 0.5 wt %, with respect to the overall weight of the polyfunctional amine solution. When the content of the carbodiimide compound satisfies the above numerical range, the salt rejection rate and the permeate flux may be improved, and hydrophilic properties and uniformity in hydrophilicity on the surface of the polyamide active layer may be advantageously enhanced.

However, when the carbodiimide compound is included in an amount greater than 0.01 wt % with respect to the overall weight of the polyfunctional amine solution, since improvements in permeate flux in accordance with an increase in the amount of the carbodiimide compound, may be restricted, it may be difficult to suppress an increase in manufacturing costs. Thus, in consideration of effects obtainable in comparison with manufacturing costs, the carbodiimide compound may be included in an amount of between 0.001 and 0.01 wt % with respect to 100 wt % of the polyfunctional amine solution.

The forming of the polyamide active layer may further include a cleaning process, and a cleansing solution used in the cleaning process may be water. The time required for the cleaning process is not particularly limited, but a period of time equal to or greater than 12 hours and equal to or less than one day may be required therefor.

In the method of manufacturing the reverse osmosis membrane, descriptions of the polyfunctional amine solution, the polyfunctional acid halide compound solution, the organic solvent, and the polyamide active layer are the same as those described above, the descriptions thereof will be omitted.

MODE FOR INVENTION

Hereinafter, the present invention will be described in detail through examples.

Example 1

18 wt % of a polysulfone solid was added to an N,N-dimethylformamide (DMF) solution and dissolved therein at a temperature of 80 to 85° C. for 12 hours or more to obtain a homogeneous liquid phase of polysulfone. The polysulfone fabricated as above was cast on a non-woven fabric formed of a polyester material and having a thickness of 95 to 100 μm, at a thickness of 45 to 50 μm and was then immersed in water. Thereby, a porous support including a polysulfone layer may be obtained.

After the porous support including the polysulfone layer was immersed in an aqueous solution including 2 wt % of m-phenylene diamine (hereinafter, referred to as 'MPD') and 0.001 wt % of N-(3-dimethylaminopropyl)-N'-ethylcarbodiimide (hereinafter, referred to as 'EDC') for 2 minutes, an excessive amount of the aqueous solution on the porous support was removed using a roller under 25 psi of pressure and the porous support was then dried for 1 minute at room temperature. Next, after the coated porous support was immersed in a polyfunctional acid halide compound solution including 0.1 wt %/v % of 1,3,5-benzenetricarbonyl trichloride (TMC) with an ISOL-C(SK Chem.) solvent for 1 minute, the support was dried for 10 minutes in an oven of 60° C. in order to remove an excessive amount of the polyfunctional acid halide compound solution. Thereafter, a reverse osmosis membrane obtained by the method was washed in 0.2 wt % of an aqueous sodium carbonate solution for two hours or more at room temperature and then washed with distilled water. Through the method described above, a polyamide layer having a thickness of 100 nm was fabricated on the polysulfone layer and a reverse osmosis membrane having a thickness of 150 μm was thereby obtained.

Example 2

A reverse osmosis membrane was obtained using the same method as that of Example 1, with the exception that 0.01 wt % of EDC was used, rather than 0.001 wt % of EDC according to Example 1.

Example 3

A reverse osmosis membrane was obtained using the same method as that of Example 1, with the exception that 0.1 wt % of EDC was used, rather than 0.001 wt % of EDC according to Example 1.

Example 4

A reverse osmosis membrane was obtained using the same method as that of Example 1, with the exception that 0.5 wt % of EDC was used, rather than 0.001 wt % of EDC according to Example 1.

Example 5

A reverse osmosis membrane was obtained using the same method as that of Example 1, with the exception that 2.5 wt % of EDC was used, rather than 0.001 wt % of EDC according to Example 1.

Example 6

A reverse osmosis membrane was obtained using the same method as that of Example 1, with the exception that 5 wt % of EDC was used, rather than 0.001 wt % of EDC according to Example 1.

Example 7

A reverse osmosis membrane was obtained using the same method as that of Example 1, with the exception that 50 wt % of EDC was used, rather than 0.001 wt % of EDC according to Example 1.

Example 8

A reverse osmosis membrane was obtained using the same method as that of Example 1, with the exception that 0.1 wt % of N,N'-bis(2-methylphenyl)carbodiimide (BPC) was used, rather than 0.001 wt % of EDC according to Example 1.

Example 9

A reverse osmosis membrane was obtained using the same method as that of Example 8, with the exception that 0.5 wt % of BPC was used, rather than 0.1 wt % of BPC according to Example 8.

Example 10

A reverse osmosis membrane was obtained using the same method as that of Example 8, with the exception that 1 wt % of BPC was used, rather than 0.1 wt % of BPC according to Example 8.

Comparative Example

A reverse osmosis membrane was obtained using the same method as that of Example 1, with the exception that the polysulfone support is immersed in an aqueous solution including 2 wt % of m-phenylene diamine (MPD) for 2 minutes, and in other words, N-(3-dimethylaminopropyl)-N'-ethylcarbodiimide (EDC) was not included in the aqueous solution including MPD.

Experimental Example 1

A reverse osmosis membrane cell apparatus used in membrane evaluation included a flat panel type permeation cell, a high pressure pump, a reservoir, and a cooling device. The flat panel type permeation cell had a cross-flow structure and an effective permeation area thereof was 140 cm$^2$.

After the respective reverse osmosis membranes that had been washed were installed on the permeation cell, a preliminary operation was sufficiently conducted, using tertiary distilled water for about 1 hour in order to stabilize the evaluation equipment. Next, after the tertiary distilled water was substituted with the 32,000 ppm of an aqueous sodium chloride (NaCl) solution and an equipment operation was conducted for about 1 hour until pressure and permeate flux reached a normal state, an amount of water permeated for 10 minutes under conditions including a pressure of 800 psi, a flow rate of 4,500 ml/min, and a temperature of 25° C. was measured to calculate fluxes. In addition, under the same condition described above, salt concentrations before and after the permeation were analyzed using a conductivity meter to calculate salt rejection rates.

Initial salt rejection rates and initial permeate fluxes were measured with respect to the reverse osmosis membranes obtained according to the Examples 1 to 10 and Comparative Example 1, and results thereof are shown in the following Table 1.

TABLE 1

| Classification | Initial salt rejection rate (%) | Initial permeate flux (GFD) |
|---|---|---|
| Example 1 | 97.83 | 44.55 |
| Example 2 | 97.77 | 47.34 |
| Example 3 | 97.83 | 48.18 |
| Example 4 | 98.27 | 49.65 |
| Example 5 | 98.37 | 48.86 |
| Example 6 | 98.23 | 48.76 |
| Example 7 | 97.96 | 47.86 |
| Example 8 | 97.61 | 46.38 |
| Example 9 | 98.12 | 45.97 |
| Example 10 | 97.94 | 47.25 |
| Comparative Example 1 | 97.28 | 43.76 |

As shown in Table 1, in the cases of the reverse osmosis membranes according to Examples 1 to 10, in which interfacial polymerization was performed after the addition of EDC or BPC, it could be confirmed that the salt rejection rate was increased and the permeate flux was increased by about 10% as compared to reverse osmosis membrane of Comparative Example 1, without being significantly affected by a concentration of the added EDC or BPC. In particular, in the case of Example 4, in which the EDC was included in an amount of 0.5 wt %, the highest degree of permeate flux could be obtained.

Experimental Example 2

An evaluation of chlorine resistance properties was undertaken with respect to the reverse osmosis membranes manufactured according to Examples 4 and 9 and Comparative Example 1.

The evaluation of chlorine resistance properties was performed using an aqueous mixed solution including 32,000 ppm of sodium chloride (hereinafter, referred to as 'NaCl') and 2,000 ppm of sodium hypochlorite (hereinafter, referred to as 'NaOCl'). In order to eliminate the penetration of chlorine and salts through the porous support including the polysulfone layer in the reverse osmosis membrane, a configuration such that salts only penetrated through the surface of the polyamide active layer by maintaining a normal state of the mixed solution after spilling the mixed solution for about 10 to 30 seconds within the evaluation equipment was formed, and variations in salt rejection rates and fluxes were measured over time.

Immediately after 32,000 ppm of an aqueous NaCl solution and 2,000 ppm of an aqueous NaOCl solution were mixed, the evaluation equipment was operated under conditions including a pressure of 800 psi, a flow rate of 4,500 ml/min, and a temperature of 25° C. to thereby measure initial salt rejection rates. Salt rejection rates over time were measured after 6 hours and after 12 hours in a state in which the reverse osmosis membranes were mounted within the evaluation equipment under the same conditions as those described above. The results are shown in the following Table 2.

TABLE 2

| Classification | Initial salt rejection rate (%) after input of NaOCl | Salt rejection rate (%) after 6 hours elapsed subsequently to input of NaOCl | Salt rejection rate (%) after 12 hours elapsed subsequently to input of NaOCl |
|---|---|---|---|
| Example 4 | 98.25 | 98.03 | 96.47 |
| Example 9 | 98.01 | 97.46 | 94.71 |
| Comparative Example 1 | 97.83 | 94.31 | 88.17 |

Further, immediately after 32,000 ppm of an aqueous NaCl solution and 2,000 ppm of an aqueous NaOCl solution were mixed, the evaluation equipment was operated under conditions including a pressure of 800 psi, a flow rate of 4,500 ml/min, and a temperature of 25° C. to thereby measure initial permeate fluxes. Permeate fluxes over time were measured after 6 hours and after 12 hours in a state in which the reverse osmosis membranes were mounted within the evaluation equipment under the same conditions as those described above. The results are shown in the following Table 3.

TABLE 3

| Classification | Initial permeate flux (GFD) after input of NaOCl | Permeate flux (GFD) after 6 hours elapsed subsequently to input of NaOCl | Permeate flux (GFD) after 12 hours elapsed subsequently to input of NaOCl |
|---|---|---|---|
| Example 4 | 49.82 | 48.35 | 45.84 |
| Example 9 | 46.05 | 45.11 | 42.63 |
| Comparative Example 1 | 44.38 | 42.08 | 39.15 |

Experimental Example 3

An evaluation of contamination resistance properties was undertaken with respect to the reverse osmosis membranes manufactured according to Examples 4 and 9 and Comparative Example 1.

The evaluation of contamination resistance properties was performed using an aqueous mixed solution including 32,000 ppm of sodium chloride (NaCl) and 100 ppm of casein. Initial salt rejection rates and initial fluxes were estimated under conditions including a pressure of 800 psi, a flow rate of 4,500 ml/min, and a temperature of 25° C., Also, an aqueous solution including 100 ppm of casein was input to an aqueous solution including 32,000 ppm of sodium chloride (NaCl) and an operation was performed thereon for hours. Then, salt rejection rates and fluxes were measured again. The results are shown in Table 4.

TABLE 4

| Classification | Initial salt rejection (%) before input of casein | Salt rejection rate (%) after 6 hours elapsed subsequently to input of casein | Initial permeate flux (GFD) before input of casein | Permeate flux (GFD) after 6 hours elapsed subsequently to input of casein |
|---|---|---|---|---|
| Example 4 | 98.38 | 99.01 | 49.56 | 42.48 |
| Example 9 | 97.91 | 98.54 | 46.02 | 40.78 |
| Comparative Example 1 | 97.45 | 98.26 | 44.28 | 36.08 |

As shown in Tables 2 to 4, in the cases of the reverse osmosis membranes according to the present invention, it may be confirmed that the salt rejection rate and the permeate flux in the polyamide active layer were increased and thus, chlorine resistance and contamination resistance properties were improved with only an addition of EDC or BPC during the interfacial polymerization, without being significantly affected by the concentration of the added EDC or BPC, as compared to the case in which neither EDC nor BPC are added.

Experimental Example 4

With respect to the reverse osmosis membranes manufactured according to Examples 4 and 9 and Comparative Example 1, concentrations of sulfur (S) and sulfur dioxide ($SO_2$) detected on a surface of the polyamide active layer were measured using TOF-SIMS analysis. The results are shown in the following Table 5.

TABLE 5

| Classification | Standard Mass (Nom. mass) | Detected Average Concentration (unit) | Standard Deviation (unit) |
|---|---|---|---|
| Concentration of S according to Example 4 | 32 | $1.595 \times 10^{-3}$ | $0.113 \times 10^{-3}$ |
| Concentration of S according to Example 9 | 32 | $1.481 \times 10^{-3}$ | $0.109 \times 10^{-3}$ |
| Concentration of S according to Comparative Example 1 | 32 | $2.035 \times 10^{-3}$ | $0.126 \times 10^{-3}$ |
| Concentration of $SO_2$ according to Example 4 | 64 | $5.645 \times 10^{-3}$ | $0.296 \times 10^{-3}$ |
| Concentration of $SO_2$ according to Example 9 | 64 | $5.247 \times 10^{-3}$ | $0.285 \times 10^{-3}$ |
| Concentration of $SO_2$ according to Comparative Example 1 | 64 | $7.973 \times 10^{-3}$ | $0.409 \times 10^{-3}$ |

As shown in Table 5, considering the fact that amounts of sulfur (S) and sulfur dioxide ($SO_2$) exposed externally, according to Examples 4 and 9 were lower than those of Comparative Example 1, it could be confirmed that the polyamide active layer including EDC further densely and compactly covered the polysulfone layer of the porous support.

Experimental Example 5

Average water contact angles and variations in water contact angles according to Examples 4 and 9 and Comparative Example 1 were measured by water-drop contact angle measurement and the results thereof are shown in the following table 6. The average water contact angle referred to a value obtained by dropping distilled water on a surface of a polyamide active layer which was dried at room temperature for several minutes and measuring a contact angle several times using a contact angle measuring device to average the measured contact angles. In addition, the variation in water contact angle referred to a value obtained by dividing a difference between the maximum value and the minimum value of respective water contact angles measured after dropping eight drops of distilled water at intervals of about 1 cm on the surface of the polyamide active layer, by the average water contact angle.

TABLE 6

| Classification | Average water contact angle (°) | Variation in water contact angle (%) |
|---|---|---|
| Example 4 | 8.9 | 5.0 |
| Example 9 | 10.1 | 8.3 |
| Comparative Example 1 | 16.5 | 72.7 |

As indicated in the Table 6, the average water contact angles and the variations in water contact angles according to Examples 4 and 9 showed increased numerical values, as compared to the case of Comparative Example 1. Thus, as in the present invention, when the polyfunctional amine solution including EDC or BPC was used at the time of forming the polyamide active layer, it could be confirmed that the polyamide active layer was densely formed on the polysulfone layer of the porous support, and hydrophilic properties and uniformity in hydrophilicity on the surface of the polyamide active layer were improved, such that the salt rejection rate and the permeate flux were increased and chlorine resistance and contamination resistance properties were enhanced.

While the present invention has been shown and described in connection with the embodiments, it will be apparent to those skilled in the art that modifications and variations can be made without departing from the spirit and scope of the invention as defined by the appended claims.

The invention claimed is:

1. A reverse osmosis membrane comprising:
    a porous support including a polysulfone layer; and
    a polyamide active layer formed on the porous support, wherein a concentration of sulfur (S) detected on a surface of the polyamide active layer is $1.8 \times 10^{-3}$ units or less on average or a concentration of sulfur dioxide ($SO_2$) detected on the surface of the polyamide active layer is $7 \times 10^{-3}$ units or less on average,
    wherein the polyamide active layer is formed by interfacially polymerizing a polyfunctional amine solution including a carbodiimide compound and a polyfunctional acid halide compound solution.

2. The reverse osmosis membrane of claim 1, wherein the polyamide active layer has variations in water contact angles within a range of 0.1 to 20%.

3. The reverse osmosis membrane of claim 1, wherein the polyamide active layer has an average water contact angle of 0° to 15°.

4. The reverse osmosis membrane of claim 1, wherein the carbodiimide compound is represented by Formula 1:

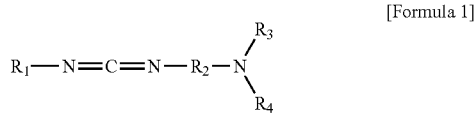

[Formula 1]

where, $R_1$, $R_3$ and $R_4$ each independently indicate a hydrogen atom, a substituted or unsubstituted alkyl group having 1 to 30 carbon atoms, or a substituted or unsubstituted aryl group having 4 to 6 carbon atoms, and $R_2$ indicates a substituted or unsubstituted alkylene group having 1 to 30 carbon atoms, or a substituted or unsubstituted arylene group having 4 to 6 carbon atoms.

5. The reverse osmosis membrane of claim 1, wherein the carbodiimide compound includes at least one compound selected from a group consisting of N-(3-dimethylaminopropyl)-N'-ethylcarbodiimide, N,N'-dicyclohexylcarbodiimide, N,N'-diisopropylcarbodiimide, and N,N'-bis(2-methylphenyl)carbodiimide.

6. The reverse osmosis membrane of claim 1, wherein the carbodiimide compound is included in an amount of 0.001 to 50 wt %, with respect to 100 w % of the polyfunctional amine solution.

7. A method of manufacturing a reverse osmosis membrane, the method comprising:
    forming a porous support; and
    forming a polyamide active layer on the porous support by interfacially polymerizing a polyfunctional amine solution including a carbodiimide compound, and a polyfunctional acid halide compound solution.

8. The method of claim 7, wherein the carbodiimide compound is represented by Formula 1:

[Formula 1]

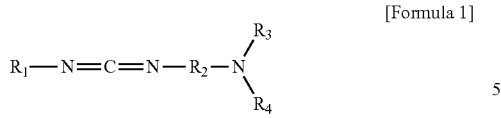

where, $R_1$, $R_3$ and $R_4$ each independently indicate a hydrogen atom, a substituted or unsubstituted alkyl group having 1 to 30 carbon atoms, or a substituted or unsubstituted aryl group having 4 to 6 carbon atoms, and $R_2$ indicates a substituted or unsubstituted alkylene group having 1 to 30 carbon atoms, or a substituted or unsubstituted arylene group having 4 to 6 carbon atoms.

9. The method of claim 7, wherein the carbodiimide compound includes at least one compound selected from a group consisting of N-(3-dimethylaminopropyl)-N'-ethylcarbodiimide, N,N'-dicyclohexylcarbodiimide, N,N'-diisopropylcarbodiimide, and N,N'-bis(2-methylphenyl)carbodiimide.

10. The method of claim 7, wherein the carbodiimide compound is included in an amount of 0.001 to 50 wt %, with respect to 100 w % of the polyfunctional amine solution.

\* \* \* \* \*